US012248305B2

(12) United States Patent
Vogl

(10) Patent No.: US 12,248,305 B2
(45) Date of Patent: Mar. 11, 2025

(54) SYSTEM AND METHOD FOR MONITORING, OPERATING AND MAINTAINING AN INDUSTRIAL PLANT, IN PARTICULAR IN THE METAL-PRODUCING INDUSTRY OR THE STEEL INDUSTRY

(71) Applicant: SMS GROUP GMBH, Duesseldorf (DE)

(72) Inventor: Norbert Vogl, Ratingen (DE)

(73) Assignee: SMS GROUP GMBH, Duesseldorf (DE)

( * ) Notice: Subject to any disclaimer, the term of this patent is extended or adjusted under 35 U.S.C. 154(b) by 463 days.

(21) Appl. No.: 17/635,513

(22) PCT Filed: Aug. 21, 2020

(86) PCT No.: PCT/EP2020/073517
§ 371 (c)(1),
(2) Date: Feb. 15, 2022

(87) PCT Pub. No.: WO2021/037734
PCT Pub. Date: Mar. 4, 2021

(65) Prior Publication Data
US 2022/0269249 A1 Aug. 25, 2022

(30) Foreign Application Priority Data
Aug. 27, 2019 (DE) ...................... 10 2019 212 852.1

(51) Int. Cl.
*G05B 19/418* (2006.01)
(52) U.S. Cl.
CPC ..... *G05B 19/4184* (2013.01); *G05B 19/4183* (2013.01); *G05B 2219/31485* (2013.01); *G05B 2219/32403* (2013.01); *G05B 2219/36159* (2013.01)

(58) Field of Classification Search
CPC ............ G05B 19/4183; G05B 19/4184; G05B 2219/31485; G05B 2219/32403;
(Continued)

(56) References Cited

U.S. PATENT DOCUMENTS

2002/0035495 A1* 3/2002 Spira .................. G06Q 10/0637
705/7.36
2014/0306819 A1 10/2014 Ghosh
(Continued)

FOREIGN PATENT DOCUMENTS

DE 102009056654 A1 3/2011
DE 102010013885 A1 10/2011
(Continued)

OTHER PUBLICATIONS

International Search Report, dated Oct. 20, 2020 in corresponding International Application No. PCT/EP2020/073517.
(Continued)

*Primary Examiner* — Kidest Bahta
(74) *Attorney, Agent, or Firm* — Amster, Rothstein & Ebenstein LLP

(57) ABSTRACT

A system and method for monitoring, operating and maintaining an industrial plant in the metal-producing industry, including: a mobile terminal device with at least one sensor for recording measured values within the industrial plant, at least one position sensor for detecting the position of the mobile terminal device in the industrial plant, a central data processing device for processing the measured values recorded by the mobile terminal device by the at least one sensor, taking into account the position of the mobile terminal device recorded by the at least one position sensor in the industrial plant, and at least one communication network for exchanging data between the mobile terminal device, the at least one position sensor and/or the central data processing device.

17 Claims, 2 Drawing Sheets

(58) Field of Classification Search
CPC .. G05B 2219/36159; G05B 1/00; G05B 9/00; G05B 11/00; G05B 2219/00; G05B 15/00; G05B 13/00
See application file for complete search history.

(56) References Cited

U.S. PATENT DOCUMENTS

| | | | |
|---|---|---|---|
| 2016/0266576 A1* | 9/2016 | Ayabakan | G05B 23/0216 |
| 2016/0282872 A1* | 9/2016 | Ahmed | G05D 1/106 |
| 2017/0264508 A1 | 9/2017 | Hummel | |

FOREIGN PATENT DOCUMENTS

| | | |
|---|---|---|
| DE | 102011089335 A1 | 6/2013 |
| DE | 102012203987 A1 | 9/2013 |
| EP | 1750872 B1 | 12/2009 |
| EP | 2150361 B1 | 8/2012 |
| EP | 2393636 B1 | 12/2012 |
| EP | 2535781 A1 | 12/2012 |
| JP | 2008052480 A | 3/2008 |
| JP | 6489562 B1 * | 3/2019 |
| KR | 10-1117207 B1 * | 3/2012 |
| WO | 2007/057061 A1 | 5/2007 |
| WO | 2011120624 A1 | 10/2011 |
| WO | 2013/186007 A1 | 12/2013 |

OTHER PUBLICATIONS

Johannes Gillar, The Future Starts Now. Controlling Machines Via Tablet . . . Scope, 2012, Issue 11, p. 14-19.

* cited by examiner

US 12,248,305 B2

SYSTEM AND METHOD FOR MONITORING, OPERATING AND MAINTAINING AN INDUSTRIAL PLANT, IN PARTICULAR IN THE METAL-PRODUCING INDUSTRY OR THE STEEL INDUSTRY

CROSS REFERENCE TO RELATED APPLICATIONS

This application is a national phase of PCT application No. PCT/EP2020/073517 filed Aug. 21, 2020, which claims priority to DE patent application No. 102019212852.1, filed August 27, which are incorporated herein by reference thereto.

FIELD OF THE INVENTION

The invention relates to a system and a method for monitoring, operating and maintaining an industrial plant, in particular in the metal-producing industry or the steel industry.

BACKGROUND OF THE INVENTION

The present invention relates in particular to the monitoring of activities in and the operation and maintenance of industrial plants such as the metal-producing industry or the steel industry. Examples of such industrial plants are blast furnaces, direct reduction plants, electric arc furnaces, converters or plants for ladle processes, plants for the primary forming or forming of metals such as continuous or billet casting plants and hot and/or cold rolling plants, extrusion plants, forging machines, ESR plants, induction furnace plants or plants upstream or downstream of these plants, such as cooling, pickling or annealing sections.

The monitoring and the resulting control or regulation of the operating procedures and processes for the operation and maintenance of an industrial plant, in particular in the metal-producing industry or the steel industry, are of great importance in order to operate the processes stably and economically. This involves in particular the control of the process engineering processes in the industrial plant, or the associated machines, units, parts or other components, as well as their monitoring and maintenance. For this purpose, for example, regular inspections of the industrial plant are carried out to monitor the operation of the industrial plant and to identify and carry out any necessary maintenance measures and to order any spare parts that may be required. As part of the inspections, measurements are usually carried out in or on the industrial plant and the measurement results are compared with target values. Based on the result of the comparison, the operation of the industrial plant can be adjusted and, if necessary, maintenance measures carried out. This has the disadvantage that the results are only compared with the target values after the inspection and are therefore only available at a later time.

It is also known from the prior art to equip individual machines, aggregates, parts or other components with sensors and to monitor specific parameters in real time. For example, DE 10 2012 203 987 A1 discloses a method for visualizing a process sequence in a metallurgical plant, in which process values are determined in real time, the process values are evaluated in order to determine any process disruptions and, if necessary, to visually display the affected components. However, the method is limited to process values that can be determined using sensors and is also limited to the detection of process disturbances.

SUMMARY

The invention is based on the object of providing a system and method for monitoring, operating and maintaining an industrial plant, in particular in the metal-producing industry or the steel industry, by means of which the industrial plant can be monitored in real time and, if necessary, the operation of the plant can be adjusted and/or maintenance measures can be initiated.

The object is achieved according to the invention by a system for monitoring, operating and maintaining an industrial plant, in particular in the metal-producing industry or the steel industry, including:
- at least one mobile terminal device with at least one sensor for recording measured values within the industrial plant,
- at least one position sensor for detecting the position of the at least one mobile terminal device in the industrial plant,
- a central data processing device for processing the measured values recorded by the at least one mobile terminal device using the at least one sensor, taking into account the position of the at least one mobile terminal device in the industrial plant recorded using the at least one position sensor, and
- at least one communication network for exchanging data between the at least one mobile terminal device, the at least one position sensor and/or the central data processing device.

With the at least one mobile terminal device, measured values can be recorded within the industrial plant. For this purpose, the mobile terminal device has at least one sensor. Simultaneously with the acquisition of the measured value by the mobile terminal device, the position of the mobile terminal device in the industrial plant is acquired by the at least one position sensor. The recorded measured value and the recorded position are transmitted to a central data processing device via a communication network. The central data processing device can process the recorded measured value taking into account the recorded position. In particular, the recorded measured value can be assigned to a specific part of the industrial plant, which allows deriving further measures from the central data processing device, such as necessary adjustments to the industrial plant or necessary maintenance work. Furthermore, required materials, in particular consumables or spare parts, can be ordered. This also allows deriving information on the current status of the industrial plant, such as the current capacity utilization. By transmitting the data via a communication network, the recorded measured values and the recorded position are processed promptly.

In a particularly preferred variant of the invention, the transmission of the recorded measured values and the recorded position and the subsequent processing by the central data processing device takes place in real time, i.e., in immediate succession.

According to an advantageous variant of the invention, the system also includes a database with position data stored therein for machines, units, parts or other components of the industrial plant, wherein the central data processing device is able to associate the measured values determined by the at least one mobile terminal device by means of the at least one sensor with a unit, a structural part or other component by comparing the position of the at least one mobile terminal device in the industrial plant detected by the at least one position sensor, with the position data stored in the database. The comparison between the detected position of the at least one mobile terminal device and the positions of machines, aggregates, structural parts or other components of the industrial plant stored in the data base can be carried out by the mobile terminal device or the central data processing device. The central data processing device assigns the recorded measured values to a machine, a unit, a part or another component of the industrial plant, so that the information is centrally available. By storing the position data of machines, aggregates, parts or other components of the industrial plant, the recorded measured values can be assigned more easily and better, which improves the accuracy of the system. The database can be accessed at least by the central data processing device, possibly also by the at least one mobile terminal device if, for example, the comparison of the recorded position of the at least one mobile terminal device with the position data of machines, units, parts or other components of the industrial plant stored in the database is carried out by the at least one mobile terminal device. If the database is only accessed by the central data processing device, the database can also be integrated into the central data processing device.

According to an expedient variant, dimensions of the machines, aggregates, parts or other components of the industrial plant are also stored in the database. In this way, the recorded measured values can be assigned more precisely to larger machines, aggregates, parts or other components that are often found in industrial plants. For example, a hot or cold rolling mill can be several meters long and by storing the dimensions of the hot or cold rolling mill in the database, the recorded measured values can be assigned more precisely to a section of the hot or cold rolling mill via the simultaneously recorded position of the at least one mobile terminal device.

In an advantageous variant of the invention, the at least one position sensor is integrated in the at least one mobile terminal device. As a result, the at least one mobile terminal device can cause the measured value and the position to be recorded at the same time.

According to an expedient variant of the invention, the sensor of the at least one mobile terminal device is a camera, a thermal imaging camera, a gas measuring device, a temperature measuring device, a pressure measuring device, a distance measuring device or comparable sensor. The measured values recorded by the sensors include, for example: physical measured values such as temperature, weight or the like; images; films; sound recordings; texts; and/or combinations thereof.

According to a further expedient variant of the invention, the at least one sensor is integrated in the mobile terminal device or can be connected to it.

According to a variant of the invention, the at least one mobile terminal device is a smartphone or tablet. Such mobile terminal devices contain, for example, a camera and/or microphone as sensors. Required sensors not contained in the mobile terminal can expediently be connected to the mobile terminal via an interface.

In a preferred variant of the invention, information stored in the central data processing device and/or the database includes construction plans, measurement data histories, maintenance information, error messages, order lists and/or the like for the industrial plant and/or machines, aggregates, parts or other components of the industrial plant. Using this stored information, the recorded measured values can be better interpreted, and necessary or advantageous actions can be determined more easily.

According to a particularly advantageous variant of the invention, the central data processing device is designed to transmit information to the at least one mobile terminal device, in particular to make the transmitted information available to the user of the at least one mobile terminal device. The information processed by the central data processing device can thus be made available to the user of the at least one mobile terminal device. This takes place, for example, visually, haptically and/or acoustically. The user of the at least one mobile terminal device thus receives immediate or timely feedback on the recorded measured values and can take or initiate any necessary actions.

According to a preferred variant of the invention, the central data processing device creates an action plan for the user of the at least one mobile terminal device and transmits the action plan to the at least one mobile terminal device. The action plan is expediently based on the recorded measured values and provides information to the user regarding actions to be taken to ensure or improve the operation of the industrial plant or to maintain the industrial plant.

In a further variant of the invention, the at least one mobile terminal device is designed to provide communication between the industrial plant and/or machines, units, parts or other components of the industrial plant and the central data processing device. As a result, the central data processing device can, for example, use the at least one mobile terminal device to change manipulated variables in the industrial plant, in particular in response to the recorded measured values.

The object is also achieved according to the invention by a method for monitoring, operating and maintaining an industrial plant, in particular in the metal-producing industry or the steel industry, including the steps of:

recording measured values within the industrial plant using a mobile terminal device, recording the position of the mobile terminal device in the industrial plant at the time the measured value is recorded, transmitting the recorded measured values and the associated recorded positions from the mobile terminal device to a central data processing device, and processing the recorded measured values, taking into account the associated recorded positions, by the central data processing device, in particular assigning the measured values to parts of the industrial plant.

Thus, according to the invention, measured values are recorded in an industrial plant by means of a mobile terminal device. At the time the measured value is recorded, the position of the mobile end device in the industrial plant is also recorded. The recorded measured value and the associated recorded position are transmitted to a central data processing site which processes the recorded measured values taking into account the recorded position. In particular, the recorded measured value is assigned to a part of the industrial plant. The central data processing device can derive further information and/or measures from the processed measured value and the associated position, such as the current state of the industrial plant, utilization of the industrial plant, maintenance measures to be carried out, adjustments in the operation of the industrial plant, initiating purchase orders or the like.

In a preferred variant of the invention, the method further includes the steps of:

storing position data of machines, aggregates, parts or other components of the industrial plant, comparing the recorded positions with the stored position data, and assigning the recorded measured values to the machines, aggregates, parts or other components of the industrial plant based on the comparison of the position data.

In particular, larger industrial plants include multiple machines, aggregates, parts or other components. By storing the position data of these machines, aggregates, parts or other components and subsequent comparison with the positions recorded during the acquisition of the measured values, the recorded measured values can be assigned exactly to the machines, aggregates, parts or other components. This increases the accuracy of the method according to the invention.

According to a variant of the invention, the dimensions of the machines, aggregates, parts or other components of the industrial plant are stored in addition to the position data. This is particularly advantageous in the case of larger machines, units, parts or other components, since the recorded measured values can thereby be assigned to a part of the machine, the unit, the part or the other component.

According to an expedient variant of the invention, the storage takes place in the central data processing device and/or in a separate database. Storage in a separate database is preferred if the mobile terminal devices are intended to access the information stored in the database. If the stored information is only accessed by the central data processing device, storage can take place directly in the central data processing device. The database can also be integrated into the central data processing device, with the central data processing device enabling access to the database so that, for example, the mobile terminal devices can access the database.

In a preferred variant of the invention, the position of the mobile terminal device is detected by means of a position sensor integrated in the mobile terminal device. This enables simultaneous, and thus synchronous, recording of the measured value and the position by the mobile device.

According to an expedient variant of the invention, the measured values are recorded by means of a camera, a thermal imaging camera, a gas measuring device, a temperature measuring device, a pressure measuring device, a distance measuring device or a similar sensor.

According to a further expedient variant, the sensor for acquiring measured values is integrated in or connectable to the mobile terminal device.

In a particularly advantageous variant of the invention, the recorded measured values and the associated positions are transmitted in real time. The measurement results are therefore available to the central data processing device for further processing immediately after having been recorded. As a result, the central data processing device can quickly process and evaluate the measurement results and initiate appropriate further measures.

According to an expedient variant of the invention, the recorded measured values include: physical measured values such as temperature, weight or the like; images; films; sound recordings; texts; and/or combinations thereof.

According to a variant of the invention, the method also includes the step of storing construction plans, measurement data histories, maintenance information, error messages, order lists and/or the like for the industrial plant and/or machines, aggregates, parts or other components of the industrial plant. Using this stored information, the recorded measured values can be better interpreted and necessary or advantageous actions can be determined more easily.

In a variant of the invention, the method also includes the step of transmitting information from the central data processing device to the mobile terminal device, in particular in order to provide the transmitted information to the user of the mobile terminal device. The information can be displayed, for example, visually, haptically and/or acoustically. According to an advantageous variant, the method also includes the step of creating an action plan for the user of the mobile terminal and transmitting the created action plan to the mobile terminal. As a result, the user of the mobile terminal device can be provided with information and/or instructions as a response to the recorded measured value and the user can take the necessary actions accordingly, with the user being supported by the information displayed by the mobile terminal device.

According to a particularly preferred variant of the invention, the method also includes the step of transmitting data from the central data processing device via the mobile terminal device to the industrial plant and/or machines, aggregates, parts or other components of the industrial plant. As a result, the central data processing device can configure the industrial plant directly, in particular in response to the recorded measured values.

In a further variant according to the invention, the method also includes the step of carrying out an inspection of the industrial plant along a predefined path through the industrial plant and recording measured values at predefined positions within the industrial plant. The method according to the invention thus makes it possible to carry out a precisely defined inspection of the industrial plant and can check the inspection by evaluating the recorded measured values and positions.

According to an advantageous variant, the method according to the invention also includes the step of continuously monitoring the position of the mobile terminal device in the industrial plant. The position data is, for example, continuously transmitted to the central data processing device, so that the central data processing device is informed at all times about the positions of the mobile terminal devices and their users in the industrial plant. According to an advantageous variant of the invention, the method also includes the step of displaying a warning by the central data processing device and/or the mobile terminal device if the mobile terminal device is located in an area of the industrial plant that is classified as safety-critical. For this purpose, the central data processing device and/or the mobile terminal device compares the continuously recorded position data with the position data of areas of the industrial plant classified as safety-critical.

BRIEF DESCRIPTION OF THE DRAWING

The invention is explained in more detail below with reference to exemplary embodiments illustrated in the attached figures. It is shown in.

DETAILED DESCRIPTION OF PREFERRED EMBODIMENTS

Figure 1:
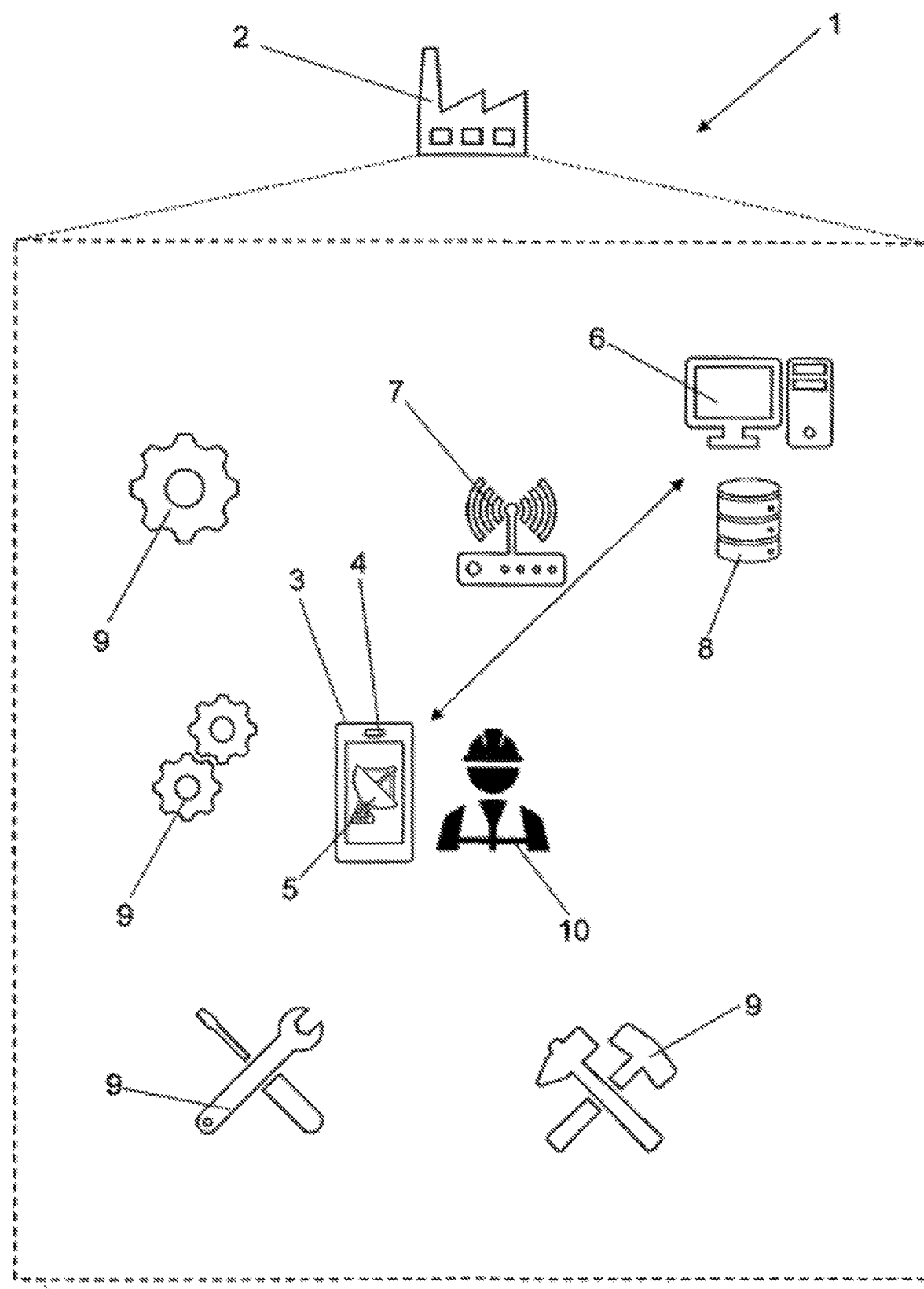
FIG. 1 a schematic view of an exemplary embodiment of a system according to the invention, and FIG. 2 a schematic diagram of a method according to the invention for carrying out an inspection of an industrial plant.

FIG. 1 shows a schematic view of an exemplary embodiment of a system 1 according to the invention for monitoring, operating and maintaining an industrial plant 2, in particular in the metal-producing industry or the steel industry.

The system 1 of FIG. 1 includes a mobile terminal device 3 with at least one sensor 4 for acquiring measured values within the industrial plant 2. The mobile terminal device 3 of FIG. 1 can for example be designed as a smartphone. The sensor 4 is, for example, a camera integrated in the mobile terminal device 3. The sensor 4 can also be a thermal imaging camera, a gas measuring device, a temperature measuring device, a pressure measuring device, a distance measuring device, a microphone or a comparable sensor 4. The different sensors 4 can be integrated into the mobile terminal device 3 or can be connected to it. The measured values recorded by the sensors 4 include, for example, physical measured values such as temperature, weight or the like; images; films; sound recordings; texts; and/or combinations thereof.

The system 1 also includes a position sensor 5 for detecting the position of the mobile terminal device 3. According to the exemplary embodiment of FIG. 1, the position sensor 5 is integrated in the mobile terminal 3. Alternatively, the position sensor 5 can also be a separate element, for example a sensor network for position detection.

The system 1 of FIG. 1 also includes a central data processing device 6 for processing the measured values recorded by the mobile terminal device 3 using the at least one sensor 4, taking into account the position of the mobile terminal device 3 in the industrial plant 2 recorded by the position sensor 5.

The system 1 also includes a communication network 7 for exchanging data between the mobile terminal device 3 and the central data processing device 6. The data exchange between the mobile terminal device 3, the position sensor 5 and the central data processing device 6 preferably takes place in real time.

The system of FIG. 1 also includes a database 8 with position data stored therein for machines 9, units 9, parts 9 or other components 9 of the industrial plant 2. The machines 9, units 9, parts 9 and other components 9 are symbolized in FIG. 1 by gears and tools. The central data processing device 6 compares the position of the mobile terminal device 3 detected by the position sensor 5 with the position data stored in the database 8 and, based on the result of the comparison, assigns the measured values detected by the sensor 4 to a machine 9, a unit 9, a part 9 or another component 9 of the industrial plant 2.

Dimensions of the machines 9, units 9, parts 9 or other components 9 of the industrial plant 2 can also be stored in the database 8. As a result, the recorded measured values can be assigned to areas of these machines 9, units 9, parts 9 and other components 9.

The database 8 can be integrated into the central data processing device 6 or arranged as an independent component in the industrial plant 2, wherein in the latter case, the database 8 is accessible via the communication network 7.

Information stored in the central data processing device 6 and/or the database 8, can further include construction plans, measurement data histories, maintenance information, error messages, order lists and/or the like for the industrial plant 2 and/or machines 9, units 9, parts 9 or other components 9 of the industrial plant 2. These are preferably considered when evaluating the recorded measured values.

The central data processing device 6 is designed to transmit information to the mobile terminal device 3, in particular to make the transmitted information available to the user 10 of the mobile terminal device 3. For example, the central data processing device 6 can create an action plan for the user 10 of the mobile terminal device 3 and transmit the action plan to the mobile terminal device 3.

The mobile terminal device 3 is expediently also designed to provide communication between the industrial plant 2 and/or machines 9, units 9, parts 9 or other components 9 of the industrial plant 2 and the central data processing device 6. As a result, the central data processing device 6 can make direct adjustments to the industrial plant 2 and/or machines 9, units 9, parts 9 or other components 9 of the industrial plant 2, for example on the basis of the recorded measured values.

The system 1 according to the invention can be used to carry out a method for monitoring, operating and maintaining an industrial plant 2, in particular in the metal-producing industry or the steel industry. The method includes the steps of:

recording measured values within the industrial plant 2 using a mobile terminal device 3, detecting the position of the mobile terminal device 3 in the industrial plant 2 at the time the measured value is recorded, transmitting the recorded measured values and the associated recorded positions from the mobile terminal device 3 to a central data processing device 6, processing of the recorded measured values, taking into account the associated recorded positions, by the central data processing device 6, in particular assigning the measured values to parts of the industrial plant 2.

The method can further include the following steps:

storage of position data from machines 9, units 9, parts 9 or other components 9 of the industrial plant 2, comparing the recorded positions with the stored position data, and assigning the recorded measured values to the machines 9, units 9, parts 9 or other components 9 of the industrial plant 2 based on the comparison of the position data.

In addition to the position data, the dimensions of the machines 9, units 9, parts 9 or the other components 9 of the industrial plant 9 can also be stored. This enables better assignment, especially for larger machines 9, units 9, parts 9 or other components 9. Furthermore, construction plans, measurement data histories, maintenance information, error messages, order lists and/or the like of the industrial plant 2 and/or machines 9, units 9, parts 9 or other components 9 of the industrial plant 2 can be stored in the central data processing device 6 and/or the database 8.

The aforementioned storage takes place in the central data processing device 6 and/or a separate database 8.

The position of the mobile terminal device 3 is preferably detected by means of a position sensor 5 integrated in the mobile terminal device 3. The measurement values are recorded, for example, by means of a camera, a thermal imaging camera, a gas measuring device, a temperature measuring device, a pressure measuring device, a distance measuring device, a microphone or a comparable sensor 4. The sensor 4 can be integrated into or connected to the mobile terminal device 3. The measured values recorded by the sensor include, for example, physical measured values such as temperature, weight or the like; images; films; sound recordings; texts; and/or combinations thereof.

The recorded measured values and the recorded associated position are transmitted in real time, i.e., without any significant delay.

The method can also include the step of transmitting information from the central data processing device 6 to the mobile terminal device 3, in particular in order to provide the transmitted information to the user 10 of the mobile terminal device 3. In particular, the central data processing device 6 can create an action plan for the user 10 of the mobile terminal device 3 and the action plan can be transmitted to the mobile terminal device 3 in order to display the action plan to the user 10 of the mobile terminal device 3.

The method advantageously includes the step of transmitting data from the central data processing device 6 via the mobile terminal device 3 to the industrial plant 2 and/or machines 9, units 9, parts 9 or other components 9 of the industrial plant 2.

The method according to the invention can be used to continuously monitor the position of the mobile terminal device 3 in the industrial plant 2, which means that, for example, the central data processing device 6 and/or the mobile terminal device 3 can display a warning if the mobile terminal device 3 is located in an area of the industrial plant 2 classified as safety-critical.

The method according to the invention can be used in particular to carry out an inspection of the industrial plant along a predefined path 11 through the industrial plant 2, wherein measured values are recorded at predefined positions within the industrial plant 2.

Figure 2:
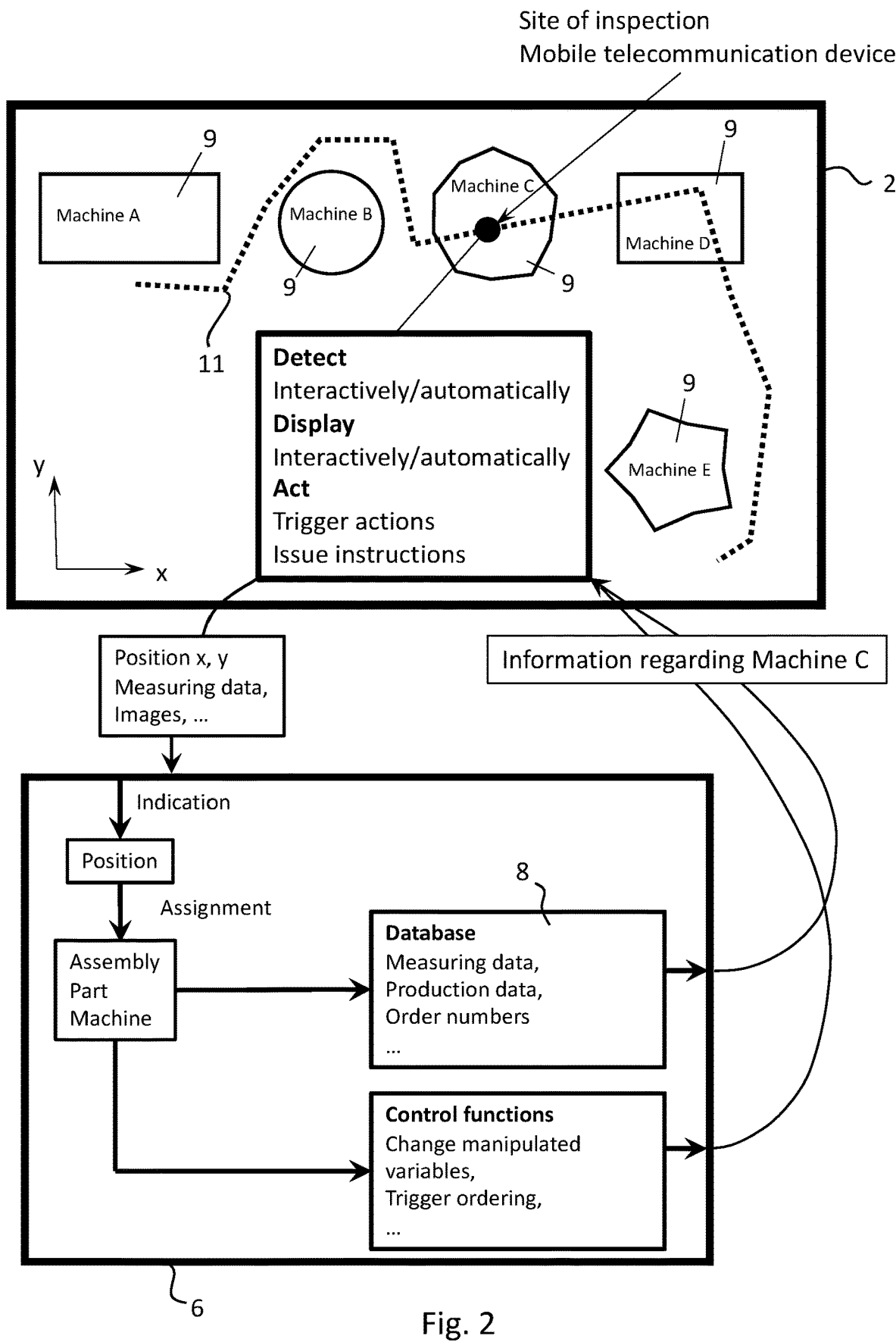

FIG. 2 shows a schematic diagram of a method according to the invention for carrying out an inspection of an industrial plant 2 along a predetermined path 11. The user 10 with the mobile terminal device 3 moves through the industrial plant 2 along the predetermined path 11. The predetermined path 11 runs inside of the industrial plant 2 along machines A to E. In the example shown in FIG. 2, the user 10 is located at machine C.

The user 10 records measured values in the industrial plant 2 by means of the mobile terminal device 3, in particular by means of associated sensors 4. The determined measured values are recorded in particular in the area of machines A to E. At the same time, the position of the mobile terminal device 3 in the industrial plant 2 is detected using a position sensor 5.

The recorded measured value and the associated position are transmitted to the central data processing device 6. There, the recorded position data are compared with position data stored in a database 8, as a result of which the recorded measured values can be assigned to machine C in the example of FIG. 2.

The central data processing device 6 can evaluate the recorded measured values and thereby derive actions, such as changing manipulated variables on the machine C or initiating an order for spare parts or consumables. The adjusted manipulated variables can, for example, be transmitted to the mobile terminal device 3 and displayed to the user 10 or transmitted directly to the machine C via the mobile terminal device 3.

In principle, the central data processing device 6 can transmit data to the mobile terminal device 3 which are displayed to the user 10 or directly cause actions by the mobile terminal device 3. For example, a construction plan of machine C can be displayed to the user 10, as a result of which the user 10 can make interventions on the machine C more easily.

LIST OF REFERENCE NUMERALS

1 system
2 industrial plant
3 mobile terminal device
4 sensors
5 position sensor
6 central data processing device
7 communication network
8 database
9 machine, unit, part, component
10 user
11 predetermined path

The invention claimed is:

1. A system for monitoring, operating and maintaining an industrial plant, in particular in a metal-producing industry or steel industry, comprising:
    at least one mobile terminal device with at least one sensor for recording measured values along a non-preprogrammed pathway within the industrial plant,
    at least one position sensor for detecting a position of the at least one mobile terminal device along the non-preprogrammed pathway in the industrial plant,
    a central data processing device for processing the measured values recorded by the at least one mobile terminal device with the at least one sensor, taking into account the position of the at least one mobile terminal device recorded with the at least one position sensor in the industrial plant, and
    at least one communication network for exchanging data between the at least one mobile terminal device, the at least one position sensor and/or the central data processing device.

2. The system according to claim 1, further comprising a database with which stores position data of machines, units, parts or other components of the industrial plant, wherein the central data processing device can assign the measured values recorded by the at least one mobile terminal device by means of the at least one sensor by comparing the position of the at least one mobile terminal device in the industrial plant recorded by the at least one position sensor with the position data of a machine, a unit, a part or other component of the industrial plant.

3. The system according to claim 2, wherein dimensions of the machines, units, parts or other components of the industrial plant are also stored in the database.

4. The system according to claim 2, wherein the at least one position sensor is integrated in the at least one mobile terminal device.

5. The system according to claim 1, wherein the at least one sensor of the at least one mobile terminal device is a camera, a thermal imaging camera, a gas measuring device, a temperature measuring device, a pressure measuring device, a distance measuring device or a comparable sensor.

6. The system according to claim 1, wherein the at least one sensor is integrated in or connectable to the at least one mobile terminal device.

7. The system according to claim 1, wherein construction plans, measurement data histories, maintenance information, error messages, and/or order lists for the industrial plant and/or machines, units, parts or other components of the industrial plant are stored in the central data processing device and/or a database.

8. The system according to claim 1, wherein the central data processing device is configured to transmit information to the at least one mobile terminal device, in particular to provide the transmitted information to a user of the at least one mobile terminal device.

9. The system according to claim 1, wherein the at least one mobile terminal device is configured to provide communication between the industrial plant and/or machines, units, parts or other components of the industrial plant and the central data processing device.

10. A method for monitoring, operating and maintaining an industrial plant, in particular in a metal-producing industry or steel industry, comprising the steps of:
- recording measured values within the industrial plant along a non-preprogrammed pathway using a mobile terminal device,
- recording a position of the mobile terminal device along the non-preprogrammed pathway in the industrial plant during each instance that one of the measured values is recorded,
- transmitting the measured values recorded and associated recorded positions from the mobile terminal device to a central data processing device, and
- processing of the recorded measured values, taking into account the associated recorded positions, by the central data processing device, in particular assigning the measured values to parts of the industrial plant.

11. The method according to claim 10, further comprising:
- storing position data of machines, units, parts or other components of the industrial plant,
- comparing the recorded positions with the stored position data, and
- assigning the recorded measured values to the machines, units, parts or other components of the industrial plant based on the comparison of the position data.

12. The method according to claim 11, wherein in addition to the position data, dimensions of the machines, units, parts or other components of the industrial plant are stored.

13. The method according to claim 10, wherein transmission of the recorded measured values and the associated recorded positions takes place in real time.

14. The method according to claim 10, further comprising the step of transmitting information from the central data processing device to the mobile terminal device, in particular in order to provide the transmitted information to a user of the mobile terminal device, in particular comprising the step of creating an action plan for the user of the mobile terminal device and transmitting the created action plan to the mobile terminal device.

15. The method according to claim 10, further comprising the step of transmitting data from the central data processing device via the mobile terminal device to the industrial plant and/or machines, units, parts or other components the industrial plant.

16. The method according to claim 10, further comprising the step of carrying out an inspection of the industrial plant along a predetermined path through the industrial plant and acquiring measured values at predetermined positions within the industrial plant.

17. The method according to claim 10, further comprising the step of continuously monitoring the position of the mobile terminal device in the industrial plant, in particular comprising the step of displaying a warning from the central data processing device and/or the mobile terminal device if the mobile terminal device is located in an area of the industrial plant that is classified as safety-critical.

* * * * *